(12) United States Patent
Kim et al.

(10) Patent No.: US 9,380,418 B2
(45) Date of Patent: Jun. 28, 2016

(54) PREEMPTIVE OFFER AND REWARDS CACHING ON DEVICE TO MINIMIZE NETWORK ROUND TRIPS

(71) Applicant: fisoc, Inc., Austin, TX (US)

(72) Inventors: Daniel Edward Kim, Austin, TX (US); Jay P. Valanju, Austin, TX (US); David H. Fruhling, II, Austin, TX (US); Brian Rainey, Austin, TX (US)

(73) Assignee: BUZZ POINTS, INC., Austin, TX (US)

( * ) Notice: Subject to any disclaimer, the term of this patent is extended or adjusted under 35 U.S.C. 154(b) by 0 days.

(21) Appl. No.: 14/594,637

(22) Filed: Jan. 12, 2015

(65) Prior Publication Data

US 2015/0201302 A1    Jul. 16, 2015

Related U.S. Application Data

(60) Provisional application No. 61/927,178, filed on Jan. 14, 2014.

(51) Int. Cl.
*H04W 4/02* (2009.01)

(52) U.S. Cl.
CPC ...................................... *H04W 4/02* (2013.01)

(58) Field of Classification Search
CPC . G01C 21/3679; H04W 4/02; G06Q 30/0205; G06Q 30/0261; G06Q 30/02; H04M 3/42348
See application file for complete search history.

(56) References Cited

U.S. PATENT DOCUMENTS

| 8,694,520 B1 | 4/2014 | Krishnakumar et al. |
| 2008/0007399 A1 * | 1/2008 | Hart ..................... G08G 1/0969 340/539.13 |
| 2012/0296564 A1 * | 11/2012 | Ma ..................... G01C 21/3679 701/436 |
| 2014/0324692 A1 | 10/2014 | Yarbrough et al. |

* cited by examiner

*Primary Examiner* — Curtis Odom
(74) *Attorney, Agent, or Firm* — Nixon & Vanderhye P.C.

(57) ABSTRACT

A mobile client device or the like stores a library of potential points of interest that are pre-transferred to the mobile device by the system. The system identifies a normal commerce range and transfers information relating to potential points of interest based on the normal commerce range of the user. By accessing the library of points of interest stored on the mobile client device, network roundtrips between the device and server can be minimized, thereby enhancing performance characteristics of the mobile client device.

19 Claims, 2 Drawing Sheets

PREEMPTIVE OFFER AND REWARDS CACHING ON DEVICE TO MINIMIZE NETWORK ROUND TRIPS

CROSS-REFERENCES TO RELATED APPLICATIONS

This application claims the benefit of U.S. Provisional Patent Application Ser. No. 61/927,178, filed Jan. 14, 2014, the entire content of which is herein incorporated by reference.

STATEMENT REGARDING FEDERALLY SPONSORED RESEARCH OR DEVELOPMENT (Not Applicable)

BACKGROUND OF THE INVENTION

The present invention relates generally to improving the performance of mobile devices and, more particularly, to improving mobile device performance by reducing network round trips.

Back and forth traffic between server and client can negatively affect device performance and unnecessarily strain battery use. It would be desirable to use data caching for anticipated queries to reduce network round trips.

BRIEF SUMMARY OF THE INVENTION

The system and methodology according to preferred embodiments overcome these drawbacks by utilizing low resolution geolocation to identify when a mobile device is within a normal commerce range and by subsequently utilizing high fidelity geolocation if there is a potential point of interest in the area. The system can then cause the device to surface the point of interest to the user without going back to the server by accessing the local cache. The device may have a library of potential points of interest that are pre-transferred to the mobile device. The library contents may be determined by the natural commerce range of the user. The library contents can be synchronized on a regular basis.

In an exemplary embodiment, a method of reducing network round trips between a server and a mobile client device includes the steps of (a) the server determining a normal commerce range for a customer owner of the mobile client device; (b) the server accessing map and commerce data to identify points of interest that fall within the normal commerce range; (c) the server storing a library of the points of interest within the normal commerce range on the mobile client device; (d) the server monitoring a broad geolocation of the mobile client device according to a low resolution geolocation boundary and identifying when the mobile client device is within the normal commerce range; (f) when the mobile client device is within the normal commerce range according to the low resolution boundary, the server identifying a detailed geolocation of the mobile client device according to a high resolution geolocation; and (g) the server identifying relevant points of interest based on the detailed geolocation of the mobile client device and presenting the relevant points of interest from the library of the points of interest stored on the mobile client device.

Step (a) may be practiced by monitoring customer commerce transactions. Monitoring customer commerce transactions may be performed by monitoring customer debit card use. The low resolution geolocation boundary may generally correspond to an area, whereas the high resolution geolocation may correspond to a specific point or address. Step (b) may be practiced by identifying points of interest that fall within the normal commerce range plus a predefined margin. Step (d) may be practiced by monitoring customer commerce transactions. Step (f) may be practiced by the server activating a GPS unit on the mobile client device.

In another exemplary embodiment, a computer system reduces network round trips between a server and a mobile client device. The computer system includes a server computer including a processor, a memory, and communication hardware for interacting with the mobile client device The server computer is programmed to determine a normal commerce range for a customer owner of the mobile client device, access map and commerce data to identify points of interest that fall within the normal commerce range, store a library of the points of interest within the normal commerce range on the mobile client device, monitor a broad geolocation of the mobile client device according to a low resolution geolocation boundary and identify when the mobile client device is within the normal commerce range, identify a detailed geolocation of the mobile client device according to a high resolution geolocation when the mobile client device is within the normal commerce range according to the low resolution boundary, and identify relevant points of interest based on the detailed geolocation of the mobile client device and present the relevant points of interest from the library of the points of interest stored on the mobile client device.

In yet another exemplary embodiment, a method of improving operation of a mobile client device by reducing network round trips between a server and the mobile client device includes the steps of (a) the server storing a library of points of interest according to a normal commerce range for a customer owner of the mobile client device; (b) the server determining when the mobile client device is within the normal commerce range; (c) the server identifying relevant points of interest based on a detailed geolocation of the mobile client device; and (d) the server presenting the relevant points of interest from the library of the points of interest stored on the mobile client device.

BRIEF DESCRIPTION OF THE DRAWINGS

These and other aspects and advantages will be described in detail with reference to the accompanying drawings, in which.

DETAILED DESCRIPTION OF THE INVENTION

Figure 1:
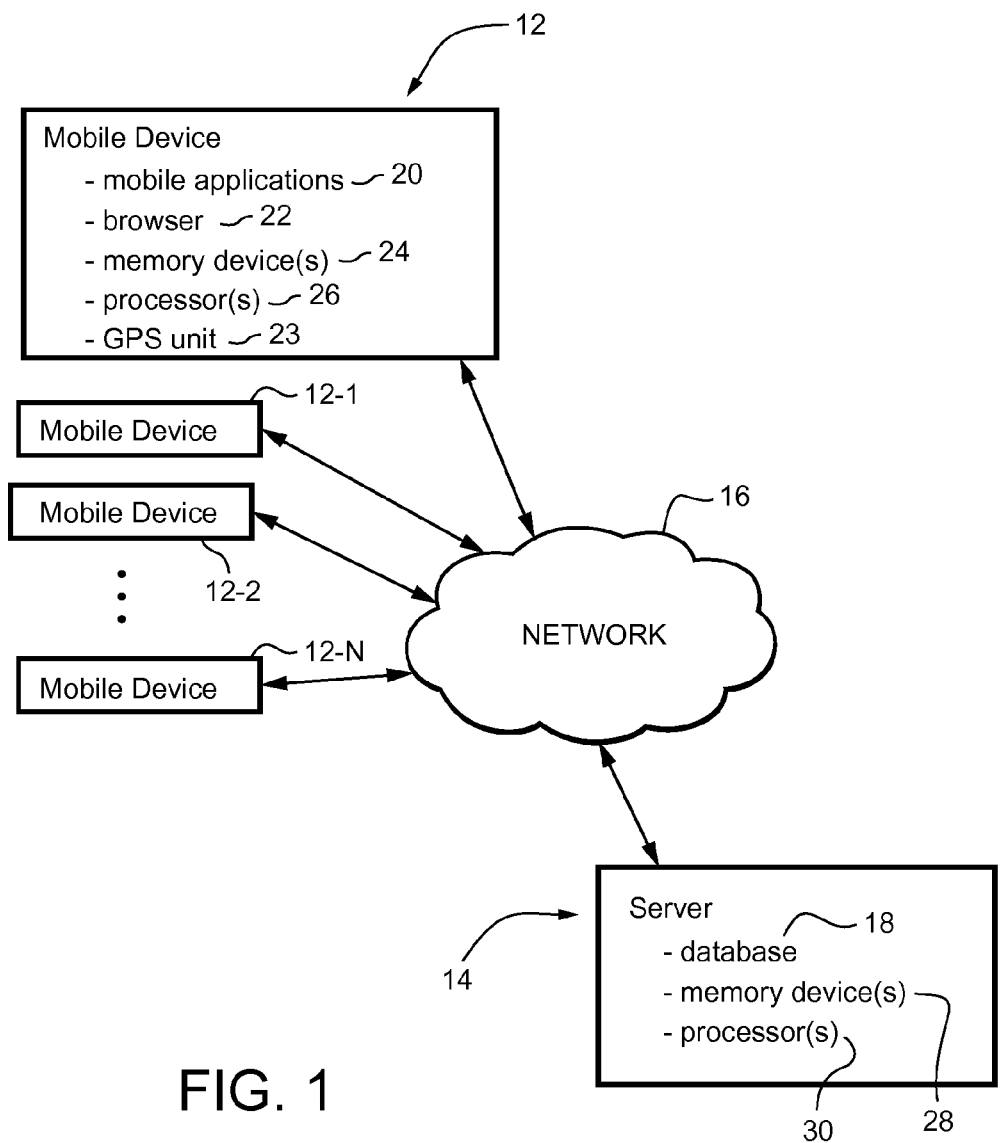
FIG. 1 is a block diagram showing an overall system linked to a network of mobile devices.

FIG. 1 shows a block diagram illustrating an overall system 10 in which a mobile device 12 transmits a request to, and receives content from, a server 14 via a network 16. Network 16 may be the Internet, a cellular network, a wired network, a wireless network, a cloud computing network, or other conventional network technology as generally recognized in the art. It is to be understood that, in practice, there will be plural and likely a very large number of mobile devices (12-1, 12-2 . . . 12-N) connected to the network 16. Also, the server 14 may be a unitary device but would preferably be implemented as a server farm or a distributed computing system in order to handle large capacities of content stored in a database 18 and the many simultaneous connections with mobile devices 12.

The mobile devices 12 may include conventional components such as one or more mobile applications 20, a browser 22, a GPS unit 23, one or more memory devices 24, and one or more processors (CPUs) 26. Conventional components such as displays, speakers, microphones, connectors, and input devices may also be included in the mobile device 12 as is well known. Examples of mobile devices 12 include such known devices as smart phones, tablets, etc., but it is to be understood that the device 12 need not be a mobile device and that the inventive concepts apply to other computing devices such as a desktop PC.

The server 14 may similarly include conventional components such as one or more memory devices 28 and one or more processors (CPUs) 30.

The execution of a typical software program illustrates that software implemented processes perform rapid activation and deactivation of transistors. Software defined instructions operate on the information stored within transistor elements. A software program may perform hundreds of millions of such operations per second. In essence, software instructions temporarily reconfigure electronic pathways and transform computing hardware to perform real, useful, and physical activity.

When an algorithm is implemented in software, it necessarily controls the hardware components to carry out computerized actions. The software thus transforms a computer into different machines and provides very different experiences.

Structure for execution of mobile software technology is described in many U.S. patents and published U.S. patent applications, for example, U.S. Pat. No. 8,694,520 and U.S. Publication No. 2014/0324692, the contents of which are hereby incorporated by reference.

Figure 2:
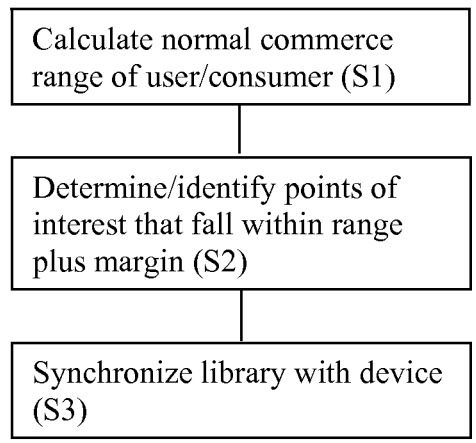
FIG. 2 is a flowchart showing a method for identifying potential points of interest.
Figure 3:
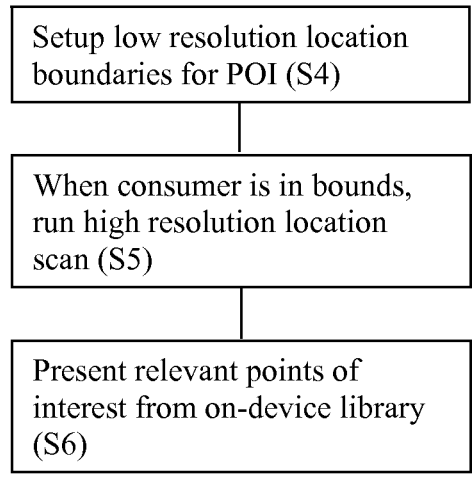
FIG. 3 is a flowchart showing a method of presenting relevant points of interest to a mobile client device from the device library.

With reference to FIG. 2, in order to reduce network round trips, the server preferably determines a normal commerce range for a customer owner of the mobile client device (Step S1). The server accesses map and commerce data to identify points of interest that fall within the normal commerce range (Step S2). In one embodiment, the system identifies the points of interest that fall within the normal commerce range plus a predefined margin (e.g., 1-100 miles depending on a size of the normal commerce range, the density of the normal commerce range, and other factors). The server subsequently stores/synchronizes a library of the points of interest within the normal commerce range on the mobile client device (Step S3).

With the library of potential points of interest pre-transferred to the mobile client device, the server monitors a broad geolocation of the mobile client device according to a low resolution geolocation boundary, and the server identifies when the mobile client device is within the normal commerce range (Step S4). The presence of the mobile client device within the normal commerce range can be determined using the low resolution geolocation boundary to reduce the use of device resources and similarly minimize network roundtrips. Examples of using low resolution geolocation boundary include browser logins, debit card transactions, IP, cell tower, backgrounded mobile geolocation, geofences, and the like.

Once the server determines that the mobile client device is within the normal commerce range according to the low resolution boundary, the server identifies a detailed geolocation of the mobile client device according to a high resolution geolocation (Step S5). For example, the server may access or activate the GPS unit 23 of the mobile client device to determine an exact location of the mobile client device. Once the detailed geolocation of the mobile client device is determined, the server identifies relevant points of interest based on the detailed geolocation and presents the relevant points of interest from the library of the points of interest stored on the mobile client device (Step S6).

Determining the normal commerce range may be practiced by monitoring customer commerce transactions. In a rewards program or the like, the system server may have access to customer debit transactions, and monitoring customer commerce transactions may be practiced by monitoring debit card use. Additionally, the system may be able to determine customer spending locations by monitoring login locations by the customer to the rewards system and/or to the web browser on the mobile client device.

Preferably, the low resolution geolocation boundary corresponds to an area, e.g., a city or zip code or the like, whereas the high resolution geolocation corresponds to a specific point or address.

With the system according to preferred embodiments of the invention, a mobile client device or the like stores a library of potential points of interest that are pre-transferred to the mobile device by the system. The system identifies a normal commerce range and transfers information relating to potential points of interest based on the normal commerce range of the user. By accessing the library of points of interest stored on the mobile client device, network roundtrips between the device and server can be minimized, thereby enhancing performance characteristics of the mobile client device.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of reducing network round trips between a server and a mobile client device, the method comprising:
   (a) the server determining a normal commerce range for a customer owner of the mobile client device;
   (b) the server accessing map and commerce data to identify points of interest that fall within the normal commerce range;
   (c) the server storing a library of the points of interest within the normal commerce range on the mobile client device;
   (d) the server monitoring a broad geolocation of the mobile client device according to a low resolution geolocation boundary and identifying when the mobile client device is within the normal commerce range;
   (f) when the mobile client device is within the normal commerce range according to the low resolution boundary, the server identifying a detailed geolocation of the mobile client device according to a high resolution geolocation; and
   (g) the server identifying relevant points of interest based on the detailed geolocation of the mobile client device and presenting the relevant points of interest from the library of the points of interest within the normal commerce range stored on the mobile client device.

2. A method according to claim 1, wherein step (a) is practiced by monitoring customer commerce transactions.

3. A method according to claim 2, wherein monitoring customer commerce transactions is performed by monitoring customer debit card use.

4. A method according to claim 1, wherein the low resolution boundary corresponds to an area, and wherein the high resolution geolocation corresponds to a specific point or address.

5. A method according to claim 1, wherein step (b) is practiced by identifying points of interest that fall within the normal commerce range plus a predefined margin.

6. A method according to claim 1, wherein step (d) is practiced by monitoring customer commerce transactions.

7. A method according to claim 1, wherein step (f) is practiced by the server activating a GPS unit on the mobile client device.

8. A computer system for reducing network round trips between a server and a mobile client device, the computer system comprising:
   a server computer including a processor, a memory, and communication hardware for interacting with the mobile client device, wherein the server computer is programmed to:
   determine a normal commerce range for a customer owner of the mobile client device,
   access map and commerce data to identify points of interest that fall within the normal commerce range,
   store a library of the points of interest within the normal commerce range on the mobile client device,
   monitor a broad geolocation of the mobile client device according to a low resolution geolocation boundary and identify when the mobile client device is within the normal commerce range,
   identify a detailed geolocation of the mobile client device according to a high resolution geolocation when the mobile client device is within the normal commerce range according to the low resolution boundary, and
   identify relevant points of interest based on the detailed geolocation of the mobile client device and present the relevant points of interest from the library of the points of interest within the normal commerce range stored on the mobile client device.

9. A computer system according to claim 8, wherein the server computer determines the normal commerce range by monitoring customer commerce transactions.

10. A computer system according to claim 8, wherein the low resolution geolocation boundary corresponds to an area, and wherein the high resolution geolocation corresponds to a specific point of address.

11. A computer system according to claim 8, wherein the server computer accesses the map and commerce data by identifying points of interest that fall within the normal commerce range plus a predefined margin.

12. A computer system according to claim 8, wherein the server computer monitors the broad geolocation of the mobile client device by monitoring customer commerce transactions.

13. A computer system according to claim 8, wherein the server computer identifies the detailed geolocation of the mobile client device by activating a GPS unit on the mobile client device.

14. A method of improving operation of a mobile client device by reducing network round trips between a server and the mobile client device, the method comprising:
   (a) the server storing a library of points of interest according to a normal commerce range for a customer owner of the mobile client device;
   (b) the server determining when the mobile client device is within the normal commerce range;
   (c) the server identifying relevant points of interest based on a detailed geolocation of the mobile client device; and
   (d) the server presenting the relevant points of interest from the library of the points of interest according to the normal commerce range for the customer owner of the mobile client device stored on the mobile client device.

15. A method according to claim 14, further comprising, prior to step (a), the server determining a normal commerce range for the customer owner of the mobile client device by monitoring customer transactions.

16. A method according to claim 15, further comprising the server accessing map and commerce data to identify the points of interest that fall within the normal commerce range.

17. A method according to claim 14, wherein step (b) is practiced by monitoring a broad geolocation of the mobile client device according to a low resolution geolocation boundary.

18. A method according to claim 14, further comprising, prior to step (c), the server identifying a detailed geolocation of the mobile client device according to a high resolution geolocation when the mobile client device is within the normal commerce range according to the low resolution boundary.

19. A method according to claim 18, wherein the step of identifying the detailed geolocation of the mobile client device is practiced by the server activating a GPS unit on the mobile client device.

* * * * *